United States Patent [19]
Sassa

[11] Patent Number: 4,983,434
[45] Date of Patent: Jan. 8, 1991

[54] FILTER LAMINATES

[75] Inventor: Robert L. Sassa, Newark, Del.

[73] Assignee: W. L. Gore & Associates, Inc., Newark, Del.

[21] Appl. No.: 411,941

[22] Filed: Sep. 25, 1989

Related U.S. Application Data

[63] Continuation-in-part of Ser. No. 385,066, Apr. 7, 1989.

[51] Int. Cl.⁵ .................. B01D 39/16; B01D 46/04; B32B 5/26; B32B 5/32
[52] U.S. Cl. .................. 428/36.2; 55/528; 210/505; 428/35.2; 428/234; 428/235; 428/236; 428/247; 428/309.9; 428/311.5; 428/316.6; 428/317.7; 428/422
[58] Field of Search .................. 55/528; 210/505; 428/36.2, 234, 235, 236, 247, 309.9, 311.5, 316.6, 317.7, 422

[56] References Cited

U.S. PATENT DOCUMENTS

| | | | |
|---|---|---|---|
| 2,893,105 | 7/1959 | Lauterbach . | |
| 4,194,041 | 3/1980 | Gore et al. | 428/316.6 |
| 4,302,496 | 11/1981 | Donovan | 428/196 |
| 4,361,619 | 11/1982 | Forsten et al. | 210/505 |
| 4,612,237 | 9/1986 | Frankenburg | 55/528 |
| 4,650,506 | 3/1987 | Barris et al. | 210/505 |
| 4,816,328 | 3/1989 | Saville et al. | 55/528 |
| 4,840,838 | 6/1989 | Wyss | 210/505 |
| 4,861,353 | 8/1989 | Wyss | 55/528 |
| 4,877,433 | 10/1989 | Oshitari | 55/528 |
| 4,902,423 | 2/1990 | Baccina | 55/528 |

Primary Examiner—James C. Cannon
Attorney, Agent, or Firm—Gary A. Samuels

[57] ABSTRACT

An expanded porous polytetrafluoroethylene (PTFE) membrane is employed in laminar conjunction with an polytetrafluoroethylene felt; in which the felt is reinforced with a woven scrim.

10 Claims, 1 Drawing Sheet

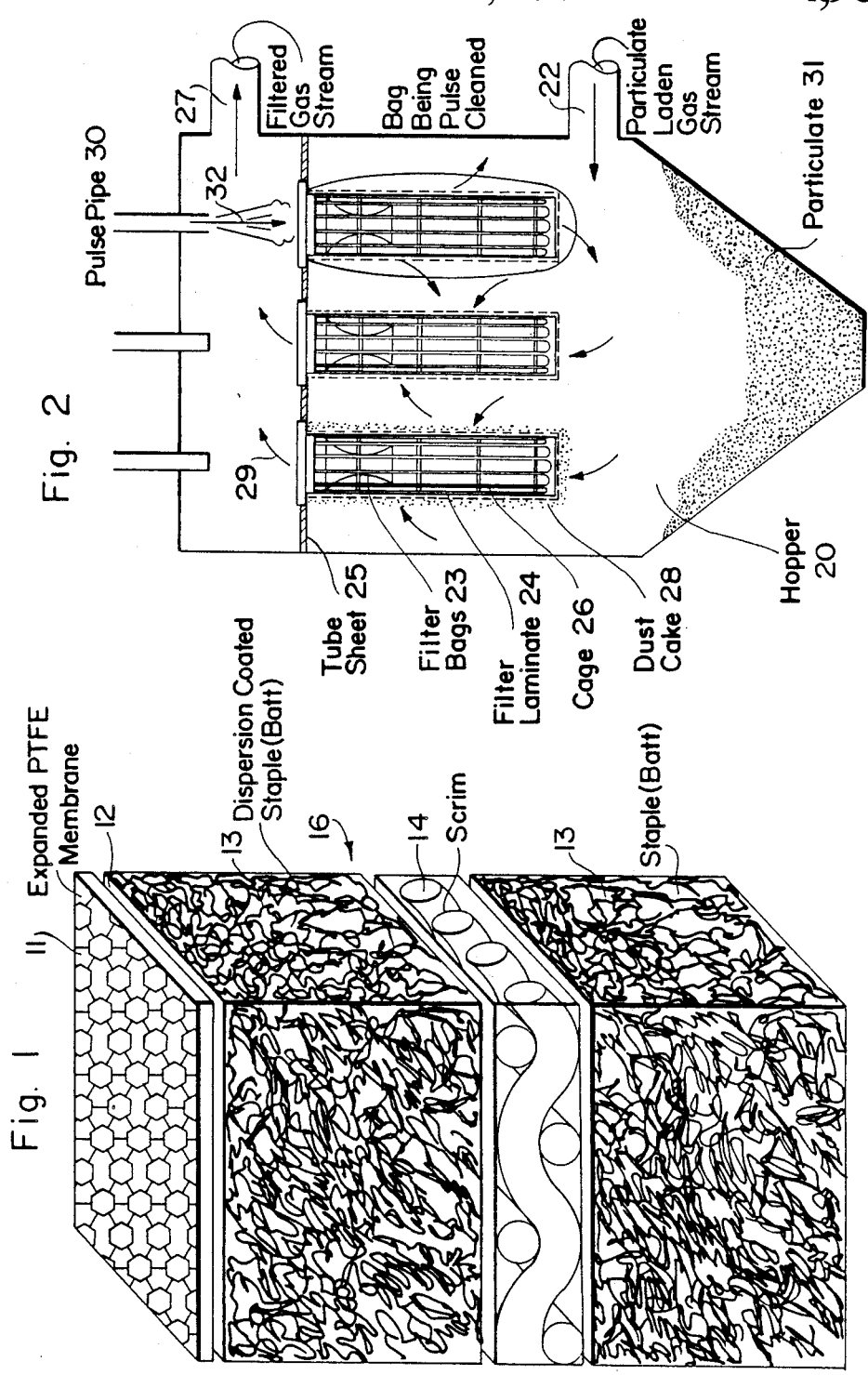

FILTER LAMINATES

CROSS REFERENCE TO RELATED APPLICATIONS

This application is a continuation-in-part of application Serial No. 07/335,066, filed Apr. 7, 1989.

FIELD OF THE INVENTION

This invention relates to membrane laminates useful as filters in filtration of solids from fluid streams, as, for example, in industrial gas streams.

BACKGROUND

The separation of particulate impurities from industrial fluid streams is often accomplished using fabric filters. These textile based filter media remove particulate from the fluids. When the resistance to flow or pressure drop through the textile caused by accumulation of particulate on the filter becomes significant, the filter must be cleaned, and the particulate cake removed.

It is common in the industrial filtration market to characterize the type of filter bag by the method of cleaning. The most common types of cleaning techniques are reverse air, shaker and pulse jet. Reverse air and shaker techniques are considered low energy cleaning techniques.

The reverse air technique is a gentle backwash of air on a filter bag which collects dust on the interior. The back wash collapses the bag and fractures dust cake which exits the bottom of the bag to a hopper.

Shaker mechanisms clean filter cake that collects on the inside of a bag as well. The top of the bag is attached to an oscillating arm which creates a sinusoidal wave in the bag to dislodge the dust cake.

Pulse jet cleaning techniques employs a short pulse of compressed air that enters the interior top portion of the filter tube. As the pulse cleaning air passes through the tube venturi it aspirates secondary air and the resulting air mass violently expands the bag and casts off the collected dust cake. The bag will typically snap right back to the cage support and go right back into service collecting particulate.

Of the three cleaning techniques the pulse Jet is the most stressful on the filter media. However, in recent years industrial process engineers have increasingly selected pulse jet baghouses for dust collection applications because of:

1. Smaller unit size (sometimes as much as ½ or ¼ the size of shakers and reverse air) due to
   (A) higher volumetric airflow/cloth area ratio (higher operating velocity through media)
   (B) on-line cleaning allows the unit to be designed at the design flow rate hence there is no need for additional filter media area to allow for off-line cleaning.
2. Minimal number of moving parts.
3. Lower number of bags to replace when failed.

The need for high temperature (400° F.), thermally stable, chemically resistant filter media in baghouses narrows the choice of filter media to only a few viable candidates for pulse jet applications. Common high temperature textiles comprise polytetrafluoroethylene (PTFE), fiberglass, or polyimides. When the effect of high temperature is combined with the effect of oxidizing agents, acids or bases, there is a tendency for fiberglass and polyimide medias to fail prematurely. Thus, there is a preferance for using PTFE. Commercially available PTFE fabrics are supported needlefelts of PTFE fiber. These felts usually weight from 20–26 oz/yd$^2$ and are reinforced with a multifilament woven scrim (4–6 oz/yd$^2$) The felts are made up of staple fibers, (usually 6.7 denier/filament, or 7.4 dtex/filament) and 2–6 inches in length. This product works similar to many other felted medias in that a primary dust cake "seasons" the bag. This seasoning, sometimes called in depth filtration, allows the media to filter more efficiently but has a drawback in that the pressure drop suffers. Eventually the bag will blind or clog and the bags will have to be washed or replaced. In general, the media suffers from low filtration efficiency, blinding and dimensional instability (shrinkage) at high temperatures.

In recent years, membrane laminate products have been used in filter applications involving pulse jet cleaning. A two layer product of porous expanded PTFE membrane laminated to woven porous expanded PTFE fiber fabric has been used. Commercial success of this product has not been realized due to several reasons, but primarily due to the woven fiber fabric backing not wearing well on the pulse jet cage supports. The woven yarns slide on themselves and create excessive stress on the membrane, resulting in membrane cracks.

The laminates of this invention are designed to solve these problems as well as provide the industrial filtration industry with the best filter media to solve high temperature, corrosive applications.

SUMMARY OF THE INVENTION

In the present invention, an expanded porous polytetrafluoroethylene (PTFE) membrane is employed in laminar conjunction with polytetrafluoroethylene felt., in which the felt is reinforced with a woven scrim.

BRIEF DESCRIPTION OF THE DRAWINGS

FIG. 1 depicts a preferred laminate structure of the invention.

FIG. 2 is a schematic picture of a filter baghouse operation.

DESCRIPTION OF THE INVENTION

This invention employs porous PTFE membranes in some of its elements. The porous polytetrafluoroethylene membrane used in one such element is prepared by a number of different known processes, but is preferably prepared by expanding polytetrafluoroethylene as described in U.S. Pat. Nos. 4,187,390; 4,110,392; and 3,953,566, to obtain expanded, porous polytetrafluoroethylene. By "porous" is meant that the membrane has an air permeability of at least 0.01 cubic feet per square foot (cfm/ft$^2$) at 0.5 inch water gauge. Air permeabilities of 300 cfm/ft$^2$ or more can be used. The pores are micropores formed by the nodes and fibrils of the expanded PTFE.

The membrane may preferably have an air permeability of at least 16 cfm/ft$^2$ at 0.5 inches water gauge, for use in gas stream filtration. Lower air permeability membranes are useful in liquid stream applications.

Expanded porous PTFE can also be used as the felt element herein. The felt element can also be made of ordinary PTFE staple fiber, i.e., fiber that has not been expanded. Expanded PTFE is, however, preferred. It is preferable to prepare the felt by the needle punching of staple fibers as generally described in Louterbach U.S.

Pat. No. 2,893,105 and the felt used in the present invention will sometimes be referred to herein as needle punched felt. The PTFE felt used herein will preferably have an air permeability of a least 30 cfm/ft$^2$ at 0.5 inches water gauge.

The scrim element can be made of any polytetrafluoroethylene, but preferably is expanded, porous polytetrafluoroethylene.

Referring to FIG. 1, a laminate 10 comprises membrane 11 made of expanded porous PTFE laminated by adhesive layer 12 to batt 13 made of expanded porous PTFE felt. A support made of a woven scrim 14 runs through batt 13. The support 14. while shown running through the batt, can be placed on the bottom of batt 13, if desired, or at any other level within batt 13 so long as it substantially parallels the sheet of membrane 11.

The felt batt and scrim combination is preferably prepared by taking a loosely, lofty carded web of staple fibers of expanded porous PTFE. The web is combined with support scrim 13. The woven scrim is placed over one of the webs and the web needle punched with the scrim under it to entangle the staple fibers of the web with the scrim. The combination is turned over and a second layer of web is needle punched to the other side of the scrim. This needle punch procedure results in simultaneous conversion of the loose webs into needle punched felt, and intimate intercontact of the scrim and staple fibers sufficient to form a unitary coherent material.

Continued needle punching will result in more compact, denser, more highly entangled material.

The felt can contain other fibers. For example, up to about 25% by weight can comprise fiber of carbon, polyimide, glass, or the like.

Heavier or lighter scrims obviously can be utilized to support the felt according to the filtration application, whether gas or liquid filtration. For example, where high machine direction (MD) strength is required, one would increase the thread count in the machine direction.

A common adhesive 12 is, for example, a fluorinated polymer adhesive, such as fluorinated ethylene propylene (FEP) copolymer, is usually coated onto felt 13 by transfer coating the top surface of the felt with an FEP aqueous dispersion. Other useful adhesives include tetrafluoroethylene/perfluoropropylene copolymer, polyvinylidene difluoride, and the like.

The adhesive is preferably a dispersion of hexafluoropropylene-tetrafluorethylene copolymer particles. The preferred concentration for this dispersion is 20–50% by weight total solids. By transfer coating one side of the felt, the weight % addition is 3–10% by weight. The material is dried in a convection oven at 200° C. for five to ten minutes. Spraying techniques have also been utilized to minimize the amount of adhesive addition. Add-on weights of 0.25–30.0% have been attained with subsequent good results upon lamination.

Lamination of the expanded porous PTFE membrane to the coated side of the felt is effected by laying the membrane on the coated side of the felt, and heating to above 270° C. (the adhesive melting point) with light pressure.

The resulting laminate is useful in filter bag assemblies, and provides good pulse jet cleaning capabilities. The use of PTFE provides good heat resistance and chemical inertness. Use of expanded porous PTFE provides increased strength and stability over ordinary PTFE materials. Use of PTFE felt provides a soft, yet durable material that can flex easily, yet withstand the stress caused by pulse jet cleaning. These stresses are of two types. One caused by the sudden expansion during pulse jet cleaning. The other caused by sudden collapsing of the bag against its rigid support members. Finally, use of the expanded porous PTFE membrane provides the high air flow rates, i.e. high permeability, necessary to good air filtration assemblies. The air permeability of the laminate of the invention will preferably be between 3 and 10 cfm/ft$^2$ at 0.5 inch water gauge. The small size of the pores, and the fine fibril network of the expanded PTFE prevents particular impurities in the air stream from penetrating through the filter assembly.

Referring now to FIG. 2, a pulse jet cleaning sequence is shown. Inside hopper 20, particulate laden gas stream 21 enters the hopper at inlet 22 and passes through filter bag 23 made of a filter laminate 24 of the invention. Tube sheet 25 inside hopper 20 prevents the gas stream from bypassing the filter bag. The filter bag 23 is kept open by supporting cage 26. The gas stream, after passing through the bag and out bag exit 29, exits the clean air compartment at outlet 27. In operation, particulate forms a dust cake 28 on the outside of the filter bag, as shown in the bag on the left of the figure. On cleaning to remove the filter cake, air from pulse pipe 30 enters the bag. This pulse of air 32 expands the bag, loosening the dust cake and thus causing particulate 31 to collect at the bottom of hopper 20. As seen in the bag on the right of the figure, the pulse jet causes the filter bag to expand. The repeated expansion and contraction of the bag against its support struts is what causes wear on the bag.

EXAMPLE

Expanded porous PTFE staple weaving fiber 400 denier monofilament was used to make a woven scrim. The scrim weighed 130 gm/m$^2$ and had a thread count of 15×14 threads/cm. (MD X CMD).

Staple fiber of expanded porous PTFE was cut to 11 cm. length. The staple was carded on conventional carding equipment using a mineral oil containing an antistatic agent. The oil is commercially available and known as Katolin GO from Albon Chemie. The carded web was placed on the scrim and needle punched. The needled product was turned over and a second carded web was needle punched into the scrim. The resulting felt was symmetrical with a 50/50 batt distribution. The final weight of the needle felt is 650 gm/m$^2$ with an air permeability of 16 cfm/ft$^2$ at 0.5 inches water gauge. This product was heat set at approximately 600° F. for several minutes.

This needle felt product was coated with a fluorinated ethylene propylene (FEP) water based dispersion (33% total solids) on one surface. The dispersion was doctor knifed onto a glass plate using a gap of approximately 0.010 inches. The product was placed face side against the wet glass plate, and rolled with a neoprene roller by hand then removed and dried in a convection oven at 200° C. for 5 minutes.

The coating add-on was 14% by weight. This piece of coated felt was then combined with a piece of porous expanded PTFE membrane having an air permeability of 18 cfm/ft$^2$ at 0.5 inches water gauge so that the membrane contacted the coated surface. The resulting swatch was placed in an aluminum foil envelope then placed in a heated hydraulic press. The top plate was heated to 335° C. and bottom remained at ambient temperature. The platens were closed and pressurized to 1650 lbs. over a 6"×6" area. Dwell time at this condition was 1 second and the plates were opened. The resulting laminate has good bond strength between layers and provided good filtration of particulate.

The membrane laminate was about 20 oz/yd$^2$ and 0.035 inches thick. It had an air permeability of 5.5 cfm./ft$^2$ at 0.5 inches water gauge.

Air permeability data is obtained by subjecting the sample to be tested to an air flow and noting the air velocity that is needed to register 0.5 inches on a pressure water gauge.

I claim:

1. A laminate comprising:
   (a) an expanded porous polytetrafluoroethylene membrane having an air permeability of at least 0.01 cubic feet per square foot at 0.5 inch water gauge;
   (b) a felt comprising a web of polytetrafluoroethylene staple fiber supported by a woven scrim of polytetrafluoroethylene.

2. The laminate of claim 1 wherein the woven scrim is attached to the felt by needle punch intermingling of the felt fibers with the scrim.

3. The laminate of claim 2 wherein the membrane is attached to the felt by an adhesive.

4. The laminate of claim 3 wherein the adhesive is a fluorinated polymer.

5. The laminate of claim 1 wherein the felt comprises expanded porous polytetrafluoroethylene.

6. The laminate of claim 1 wherein the felt comprises non-expanded polytetrafluoroethylene.

7. The laminate of claim 1 wherein the felt contains up to 25 weight percent of fiber selected from carbon fiber, polyimide fiber, glass fiber, and mixtures thereof.

8. The laminate of claim 1 in the form of a cloth.

9. The laminate of claim 1 in the form of a filter bag.

10. The laminate of claim 1 wherein the woven scrim is expanded porous polytetrafluoroethylene.

* * * * *